*Mills & Waldo,*

*Circular Saw Mill.*

*No. 100,784.* *Patented Mar. 15, 1870.*

Witness.
W. M. Horner.
J. W. G. Jenkins.

Inventor.
Jno. Mills
D. G. Waldo
B. Weir
Jno. B. Smith

United States Patent Office.

JONATHAN MILLS AND ALBERT G. WALDO, OF MILWAUKEE, WISCONSIN.

Letters Patent No. 100,784, dated March 15, 1870; antedated February 28, 1870.

IMPROVEMENT IN CIRCULAR-SAW MILL.

The Schedule referred to in these Letters Patent and making part of the same.

*To all whom it may concern:*

Be it known that we, JONATHAN MILLS and ALBERT G. WALDO, of the city and county of Milwaukee, and State of Wisconsin, have invented a new and useful Improvement in Double Circular-Saw Mills; and we do hereby declare that the following is a full, clear, and exact description thereof, which will enable those skilled in the art to make and use the same, reference being had to the accompanying drawing forming part of this specification, in which—

Similar letters of reference in each of the figures indicate corresponding parts.

Figure 1:
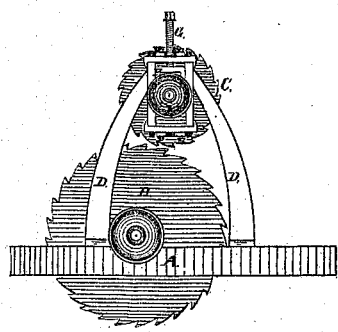
Figure 1 is a side view of our invention.
Figure 2:
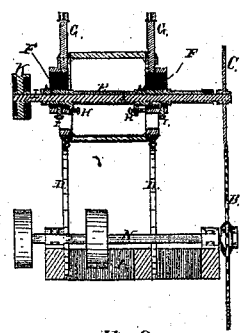
Figure 2 is an end sectional view.
Figure 3:
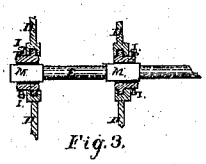
Figure 3 is a side view of a hollow sleeve, in which runs the upper saw-mandrel.
Figure 4:
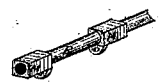
Figure 4 is an end view of the hollow sleeve.

The nature of our invention consists in arranging the upper saw in a double mill so as to overhang, and also to be raised and lowered and set with screws, so as to be adjusted in an easy and correct manner.

A is the saw-frame.

B, the main saw.

C, the upper saw.

D D, an iron stand to support the upper saw C.

E is a hollow sleeve for the mandrel of saw C to run in.

F is a movable frame, which can be moved up and down at will, holding the sleeve E in order to regulate the saw C, as it is worn out.

G G are screws, with which to raise and lower the saw C as may be required.

H H are set-screws through burs on sleeve E, to give a lateral motion to the upper saw C, in order to keep it in line with the lower saw B.

I I are also set-screws, for the purpose of setting the saw with more or less rake, as circumstances may require.

K, pulley on upper saw-mandrel.

L, mandrel for saw C running on sleeve E.

M M, boxes on sleeve E in which mandrel L runs.

N, mandrel of lower saw B.

What we claim as our invention, and desire to secure by Letters Patent, is—

Saw C, stand D, sleeve E, frame F, screws G, H, and I, and mandrel L, in combination with saw B, substantially as described.

JNO. MILLS.
A. G. WALDO.

Witnesses:
J. B. SMITH,
J C. POLLARD.